United States Patent [19]
Jacobs

[11] 3,847,589

[45] Nov. 12, 1974

[54] METHOD OF CONTROLLING PLANT GROWTH WITH 3-SUBSTITUTED LUMAZINES

[75] Inventor: Richard L. Jacobs, Perrysburg, Ohio

[73] Assignee: The Sherwin-Williams Company, Cleveland, Ohio

[22] Filed: Mar. 1, 1973

[21] Appl. No.: 336,968

Related U.S. Application Data

[60] Division of Ser. No. 867,873, June 26, 1968, Pat. No. 3,732,224, which is a continuation-in-part of Ser. No. 740,045, June 26, 1968, abandoned.

[52] U.S. Cl. .................................. 71/92, 71/66
[51] Int. Cl. ................................... A01n 9/22
[58] Field of Search .................................. 71/92

[56] References Cited
UNITED STATES PATENTS

| | | | |
|---|---|---|---|
| 3,635,973 | 1/1972 | Jacobs | 71/92 X |
| 3,752,816 | 8/1973 | Cooke et al. | 71/92 X |

*Primary Examiner*—James O. Thomas, Jr.

[57] ABSTRACT

A method for controlling plant growth and new compounds used in such method. The method includes the step of applying the new compounds to the locus to be protected. The components are 3-substituted-lumazines, where the 3-substitutent is a member of the group consisting of alkyl groups having from two to eight carbon atoms and cycloalkyl groups having from 3 to 12 carbon atoms.

5 Claims, No Drawings

METHOD OF CONTROLLING PLANT GROWTH WITH 3-SUBSTITUTED LUMAZINES

This is a divisional of Ser. No. 867,873, now U.S. Pat. No. 3,732,224, filed Oct. 20, 1969 which is a continuation-in-part of applications Ser. No. 740,045 and Ser. No. 740,009, both filed June 26, 1968 and both now abandoned.

BACKGROUND OF THE INVENTION

This invention relates to a method for controlling plant growth, and to new compounds used in such method which have been found to have utility as plant growth regulators, selective weed killers, defoliating agents, and as agricultural chemicals.

In recent years increased crop yields have been made possible by the development and use of chemicals which are specifically toxic to weeds, yet do not damage crops around which they are applied. In general, the currently available chemicals which are most desired for their selectivity and as total herbicides are sufficiently expensive that expense is a significant factor in their use. Therefore, new compounds and inexpensive methods for producing such compounds are constantly being sought.

In addition, while many compounds presently on the market are effective to control the growth of certain species of weeds, they are ineffective against others. Thus new herbicides which have broad spectrum effectiveness against a wide variety of weeds are continually being sought. A family of 3-substituted lumazines of the type described herein has been found particularly effective.

An object of the invention is to provide a method for controlling weeds.

Another object of the invention is the provision of a new family of compounds useful as broad spectrum herbicides.

Other objects and advantages of this invention will be apparent from the description to follow:

SUMMARY OF THE INVENTION

The compositions of the invention comprise compounds of the type exemplified by the formula below.

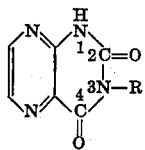

Infrared and nuclear magnetic resonance spectra indicate that the above formula represents the principal structure, but that a minor portion may be in the enolic form:

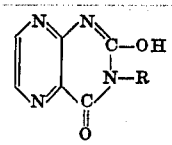

Such compounds have been found to be active as selective herbicides when R has been selected from the group consisting of alkyl groups having from two to eight carbon atoms and cycloalkyl groups having from 3 to 12 carbon atoms.

The method of the invention comprises applying an effective quantity of at least one of the above compounds to the locus to be protected.

The 3-substituted lumazines can be prepared by using 2,3-pyrazinedicarboximide* as a starting material, producing a diamide by reacting the imide with an amine of the formula $RNH_2$ wherein R is selected from the group consisting of alkyl groups having from two to eight carbon atoms and cycloalkyl groups having from 3 to 12 carbon atoms, and reacting the amide with sodium hypochlorite in the presence of sodium hydroxide. The preparation of N-isopropyl-2,3-pyrazinedicarboxamide is used as an example.

*Gabriel and Sonn, Chem. Ber., 40, 4857

EXAMPLE I

PREPARATION OF N-ISOPROPYL-2,3-PYRAZINEDICARBOXAMIDE

A 250 ml., 3-necked flask equipped with a stirrer, thermometer and condenser fitted with a $CaCl_2$ drying tube, was charged, at room temperature, with 26.1 g. of 2,3-pyrazinedicarboximide and 200 ml. of tetrahydrofuran. To the stirred reaction mixture was added, in one portion, 11.8 g. of isopropylamine. Within one hour, a clear brown solution was observed. After three hours, the solution was cooled to 2°* whereupon solids formed. The solids were removed by filtration. The filtrate was concentrated to a volume of 10–15 ml. in vacuo and a second crop of solids removed by filtration. Both crops of solids were air dried under infrared lamps. The overall yield of material was 97.8 percent with a melting point of 180°–182°, and an elemental analysis as follows:

|   | Theory | Found |
|---|--------|-------|
| C | 51.92  | 51.82 |
| H | 5.81   | 5.80  |
| N | 26.91  | 27.06 |

The reaction can be illustrated as follows:

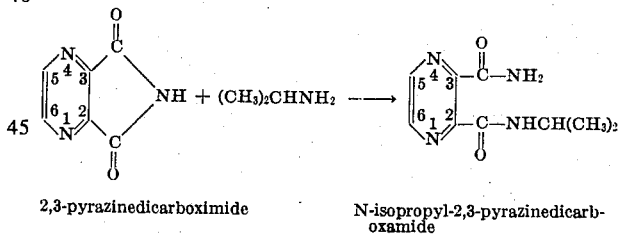

2,3-pyrazinedicarboximide     N-isopropyl-2,3-pyrazinedicarboxamide

*All temperatures reported herein and in the attached claims are in degrees centigrade unless otherwise specified.

The other N-substituted-2,3-pyrazinedicarboxamides used in this invention can be prepared in substantially the same manner with appropriate substitutions being made in the selection of the amine, $RNH_2$, R having the meaning previously designated.

The 3-substituted lumazines of the invention can be produced from the corresponding dicarboxamide by reacting (1) a compound having the formula

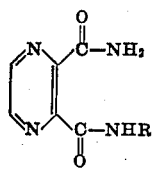

wherein R is a member of the group consisting of alkyl groups having from two to eight carbon atoms, and cycloalkyl groups having from 3 to 12 carbon atoms, with (2) sodium hypochlorite, the reaction being carried out in the presence of sodium hydroxide and a suitable solvent, preferably at elevated temperatures.

The reaction is illustrated generally below, R having the meaning assigned in explaining the immediately preceding formula.

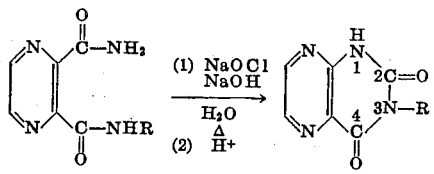

The reaction is self-generating and will proceed in the absence of heat, but the reaction will go faster if the reaction mixture is heated. For that reason it is preferable to heat the reaction mixture to a temperature from about 50° to the boiling temperature thereof, most desirably about 60°–80°, and hold it at such temperature for about one-half hour. Thereafter the mixture is cooled to room temperature and neutralized with acid at which time the reaction product precipitates.

This invention can be more clearly understood by reference to the following examples. The examples, however, are not intended to be limiting.

EXAMPLE 2

PREPARATION OF LUMAZINE, 3-SEC-BUTYL

A flask equipped with a stirrer and a thermometer, and surrounded by a heating mantle was charged with 220 ml. water, 2.6 g. sodium hydroxide and 58 ml. aqueous solution containing 4.7 g. NaOCl. Stirring was commenced, and was continued throughout the reaction. When this charging was complete, the temperature of the charge was 22.5°; then, 12 g. N-sec-butyl-2,3-pyrazinedicarboxamide was added to the NaOCl-NaOH solution in the flask. After the pyrazinedicarboxamide dissolved, the temperature of the reaction mixture was 25.5°; the reaction mixture was then heated for a total of about 38 minutes. The temperature after 7 minutes of heating was 80°, after 38 minutes of heating 89°. The heating mantle was then removed, and the flask was immersed in an ice bath and cooled to 50°. The reaction mixture was then filtered, and the filtrate was cooled to 20°. The filtrate was then slowly neutralized with acetic acid. The lumazine, 3-sec-butyl product, which had separated as a light yellow precipitate, was separated from the mother liquor by filtration, using a Buchner funnel. The filtrate was set aside overnight, then salted with KCl, and a second crop of precipitate was recovered. The combined final product was washed with tap water and dried in a circulating air oven in which the air was maintained at a temperature within the range of 80° to 100°. The total recovery of dried product amounted to 8.4 g., or 71 percent of theory. It was determined by nuclear magnetic resonance analysis that the product (m.p. 179°–182°) was lumazine, 3-sec-butyl.

Elemental analysis gave the following results:

| Element | Theory | Found |
|---|---|---|
| C | 54.5% | 54.3% |
| H | 5.4% | 5.5% |
| N | 25.4% | 25.6% |

EXAMPLE 3

PREPARATION OF LUMAZINE, 3-CYCLOHEXYL

A flask equipped with a stirrer and a thermometer, and surrounded by a heating mantle was charged with 240 ml. water, 3.1 g. sodium hydroxide and 70 ml. aqueous solution containing 5.2 g. NaOCl. Stirring was commenced, and was continued throughout the reaction. When this charging was complete, the temperature of the charge was 23°; then 18.1 g. N-cyclohexyl-2,3-pyrazinedicarboxamide was added to the NaOCl-NaOH solution in the flask. After the pyrazinedicarboxamide dissolved, the temperature of the reaction mixture was 25°; the reaction mixture was then heated for a total of about 36 minutes. The temperature after 6 minutes of heating was 80°, after 26 minutes 90°, and after 36 minutes 90°. The heating mantle was then removed, and the flask was immersed in an ice bath and cooled to 18°. The reaction mixture was then acidified, by making a gradual addition of glacial acetic acid, to a pH of 5. The rate of addition of acetic acid was controlled so that the temperature of the reaction mixture in the flask did not rise significantly. The lumazine, 3-cyclohexyl product, which had separated as a white precipitate, was separated from the mother liquor by filtration, using a Buchner funnel. The final product was washed with tap water and dried in a circulating air oven in which the air was maintained at a temperature within the range of 80° to 100°.

The total recovery of dry product, melting point 238°–240°, amounted to 19.3 g. The product was subjected to elemental analysis with the following results:

| Element | Theory | Found |
|---|---|---|
| C | 58.5% | 58.2% |
| H | 5.7% | 5.8% |
| N | 22.7% | 23.0% |

EXAMPLES 4 THROUGH 6

Several other compounds of the invention have been produced by the above described method. Information concerning starting materials, batch sizes, final product and yield for representative ones of such preparations is presented in Table I, below:

TABLE I

| | Starting Amide | | Metal Hypohalite | | | Base | | |
|---|---|---|---|---|---|---|---|---|
| Example | Name | grams | Name or formula | grams | ml. Solution | Name or formula | grams | Added water, ml. |
| 4 | N-cyclooctyl-2,3-pyrazinedicarboxamide | 24 | NaOCl | 6.5 | 83 | NaOH | 7.1 | 400 |
| 5 | N-isopropyl-2,3-pyrazinedicarboxamide | 25 | NaOCl | 8.9 | 111.6 | NaOH | 4.9 | 400 |
| 6 | N-butyl-2,3-pyrazinedicarboxamide | 12 | NaOCl | 4.7 | 59 | NaOH | 2.6 | 220 |

Final Product

|   | Name | Yield (grams) |
|---|---|---|
| 4 | lumazine,3-cyclooctyl-, | 22.1 |
| 5 | lumazine,3-isopropyl-, | 20.7 |
| 6 | lumazine,3-n-butyl-, | 9.7 |

Time-temperature readings for each of the reactions represented by the Examples set forth in Table I are presented in Table II below. Zero time is when the amide is added to the reaction mixture.

TABLE II

| Example | Time Minutes-Seconds | Temperature |
|---|---|---|
| 4 | 0:00 | 20° |
|   | 4:00 | 21 |
|   | 13:00 | 75 |
|   | 15:00 | 80 |
|   | 20:00 | 82 |
|   | 24:00 | 83.5 |
|   | 34:00 | 85 |
|   | 37:00 | 85 |
|   | 44:00 | 84 |
| 5 | 0:00 | 25° |
|   | 5:00 | 21 |
|   | 10:00 | 21 |
|   | 11:00 | 25 |
|   | 20:00 | 73 |
|   | 25:00 | 77 |
|   | 55:00 | 77 |
| 6 | 0:00 | 27° |
|   | 3:00 | 23 |
|   | 5:00 | 24.5 |
|   | 6:00 | 25 |
|   | 7:00 | 34 |
|   | 8:00 | 50 |
|   | 10:00 | 75 |
|   | 10:00 | 78 |
|   | 11:00 | 80 |
|   | 15:00 | 83 |
|   | 20:00 | 83 |
|   | 30:00 | 83 |
|   | 41:00 | 80.5 |

The structure of the final compounds of Examples 4, 5 and 6 were confirmed by elemental analysis, infrared and nuclear magnetic resonance spectra.

The other 3-substituted lumazines of this invention can be made by the procedures described in Examples 2 and 3, above, substituting the appropriate N-substituted-pyrazinedicarboxamide for the N-sec-butyl-2,3-pyrazinedicarboxamide and the N-cyclohexyl pyrazinedicarboxamide starting materials.

DISCUSSION OF THE REACTANTS

The best yields are obtained when one equivalent of base and one equivalent of hypohalite are used for each mole of the pyrazinedicarboxamide. Satisfactory results, however, have been achieved when as much as two equivalents of the hypohalite were used per mole of the pyrazinedicarboxamide.

While the method above described contemplates the use of alkali and alkaline earth metal hydroxides and alkali and alkaline earth metal hypohalites, sodium hydroxide and sodium hypohalite are preferred for economic reasons only. The other metal hydroxides and metal hypohalites are perfectly satisfactory but the cost thereof is much greater.

The metal hypohalite may be prepared by reacting chlorine or bromine with a water solution of an alkali metal or alkaline earth metal hydroxide, preferably sodium hydroxide. For example, a 1 N. sodium hypochlorite solution can be prepared by reacting 79.98 g. NaOH with 70.90 g. chlorine ($Cl_2$) in sufficient water to make one liter. It can be appreciated that one equivalent of bromine ($Br_2$) can be substituted for chlorine to produce a sodium hypobromite solution; and in the same manner, 1 equivalent of an alkali or alkaline earth metal hydroxide can be substituted for the sodium hydroxide to produce a different metal hypohalite.

Water is the preferred solvent medium for the reaction due to low cost. Other solvents could be used alone or mixed with water such as alcohols or equivalents if they do not interfere with the course of the reaction. There is no advantage to this, however. The exact amount of water to be used is not critical. The best results have been achieved with approximately 2 l. of water per mole of the starting amide. Satisfactory results have been achieved with as much as 20 l. and as little as 1 l. of water.

DISCUSSION OF THE REACTION METHOD

In carrying out the process of producing the compositions of the invention the metal hypohalite should first be admixed with the base, and then the amide should be added thereto. If the components are not admixed in this manner, there is a tendency for the amide to hydrolyze to the corresponding acid resulting in a lower yield.

The temperature at which the reaction is conducted can range from 0° to 100° with 60°–80° being the most preferred. The reaction mixture should be held at the desired temperature for about one-half hour or until a negative test for hypohalite indicates the completion of the reaction.

At the end of the reaction, the reaction mixture is cooled to room temperature and neutralized with acid to a pH in the range of 10 to 4 to precipitate the product which can then be collected by filtration, washed and dried. The preferred pH range is from 5 to 6. A variety of acids can be used for the pH adjustments, but mineral acids and simple organic acids such as acetic acid are most preferred for economic reasons.

The 3-substituted lumazine compounds have been found to display unexpectedly high levels of herbicidal activity and to be useful in controlling undesirable plants of both the *monocotyledonous* and the *dicotyledonous* species on either a postemergence or a preemergence basis.

By "preemergence" is meant that the compound is applied to the soil prior to emergence of the weed species sought to be controlled. This term, as used herein, also means the application of the herbicidal compounds falling within the scope of this disclosure to areas wherein useful or desirable plants are either growing or have been sown, but where the undesirable plants sought to be controlled have not as yet emerged.

By the term "postemergence" is meant that the compound is applied to the plant sought to be controlled after it has emerged from the soil surface. This term is also used to describe the application of herbicidally active compounds to soil surface in and around growing plants sought to be controlled for purposes of effecting root absorption by the undesirable plant species.

Especially active are the compounds where the 3-substituent is isopropyl, sec-butyl, cyclohexyl, or cyclooctyl.

The invention will be more clearly understood by reference to the following examples.

EXAMPLE 7

The preemergence and postemergence herbicidal activity of lumazine, 3-cyclooctyl is shown in Table III below.

In using the compound, seeds of the type of plants set forth in Table III were sown in fresh soil. In the preemergence test the soil was sprayed with a solution of the test compound immediately after the seeds were planted, and before any noticeable growth developed in the test area. The solution was about a 2 percent by weight solution of the compound in acetone and/or alcohol. The compound was applied at the rate of 16 pounds per acre of soil surface.

Approximately three weeks after spray application, the herbicidal activity of the compound was determined by visual observation of the treated area in comparison with untreated control areas. These observations are reported below in Table III wherein the average activity rating is reported as the percent control of plant growth.

In the postemergence test the soil and developing plants were sprayed about two weeks after the seeds were sown. The compound was applied at the rate of 8 pounds per acre from about a 2 percent by weight solution of the test compound in alcohol and/or acetone. The postemergence herbicidal activity was measured in the same way as the preemergence activity; i.e., visual observation approximately 11 days after spraying, and expressed as the percent control of plant growth.

TABLE III

Compound Applied: lumazine, 3-cyclooctyl

| | Preemergence Treatment % Control | Postemergence Treatment % Control |
|---|---|---|
| Alfalfa | 100 | 10 |
| Corn | 30 | 10 |
| Wild Oats | 100 | 10 |
| Cheatgrass | 100 | 0 |
| Foxtail | 40 | 50 |
| Barnyardgrass | 70 | 90 |
| Crabgrass | 90 | 100 |
| Nutgrass | 30 | 10 |
| Johnsongrass | 90 | 100 |
| Curled Dock | 100 | 100 |
| Snapbeans | 100 | 100 |
| Yellow Rocket | 100 | 100 |
| Chickweed | 100 | 100 |
| Cucumber | 100 | 100 |
| Pigweed | 100 | —* |
| Velvetleaf | 100 | 100 |
| Lambsquarters | 100 | 100 |

* No value obtained other compounds disclosed herein can be used as preemergence or postemergence herbicides in a similar manner. In the case of lumazine, 3-cyclohexyl and lumazine, 3-sec-butyl, substantially the same application rates, e.g., as similar or salt solutions in water, are effective; this is also generally true of the other members of the lumazine family, although slightly higher application rates may be required.

Information concerning the 3-substituted lumazine family of compounds applied as described, and discussed above as having an unexpectedly high order of herbicidal activity, is presented in the following table.

TABLE IV

Compound Applied

| | Lumazine, 3-isopropyl Pre* (% Control) | Lumazine, 3-isopropyl Post** (% Control) | Lumazine, 3-sec-butyl Pre (% Control) | Lumazine, 3-sec-butyl Post (% Control) | Lumazine, 3-cyclohexyl Pre (% Control) | Lumazine, 3-cyclohexyl Post (% Control) | Lumazine, 3-n-butyl Pre (% Control) | Lumazine, 3-n-butyl Post (% Control) |
|---|---|---|---|---|---|---|---|---|
| Alfalfa | 100 | 0 | 100 | 50 | 100 | 100 | 0 | 0 |
| Corn | 10 | 0 | 10 | 0 | 40 | 10 | 0 | 0 |
| Wild Oats | 10 | 0 | 30 | 0 | 20 | 10 | 0 | 0 |
| Cheatgrass | 10 | 0 | 90 | 0 | 10 | 50 | 0 | 0 |
| Foxtail | 10 | 0 | 30 | 0 | 20 | 10 | 0 | 0 |
| Barnyardgrass | 0 | 0 | 40 | 0 | 20 | 10 | 0 | 0 |
| Crabgrass | 70 | 0 | 100 | 0 | 80 | 20 | 0 | 0 |
| Nutgrass | 0 | 0 | 40 | 0 | 100 | 100 | 0 | 0 |
| Johnsongrass | 70 | 0 | 40 | 0 | 30 | 20 | 0 | 0 |
| Curled Dock | 100 | 0 | 70 | 50 | 90 | 100 | 0 | 0 |
| Snapbeans | 90 | 30 | 90 | 20 | 100 | 100 | 30 | 10 |
| Yellow Rocket | 100 | — | 100 | 100 | 100 | 100 | 0 | 70 |
| Chickweed | 60 | 0 | 40 | 0 | 100 | 90 | 90 | 0 |
| Cucumber | 100 | 10 | 10 | 60 | 100 | 100 | — | — |
| Pigweed | 100 | 0 | 100 | 20 | 100 | 90 | 0 | 0 |
| Velvetleaf | 100 | 0 | 100 | 90 | 100 | 100 | 0 | 0 |
| Lambsquarters | 100 | 40 | 100 | 100 | 100 | 100 | 0 | 70 |
| Soybeans | — | — | — | — | — | — | 0 | 0 |
| Marigold | — | — | — | — | — | — | 0 | 100 |

* Preemergence test: compound applied at rate of 16 lb/acre
** Postemergence test: compound applied at rate of 8 lb/acre The same solutions of the same compound can also be sprayed, for example along railroad right-of-ways, at an application rate of about 10 to 16 pounds per acre as a total herbicide, i.e., to prevent all vegetation. The The cycloalkyl substituted lumazines have additionally been found to possess high rates of herbicidal activity on aquatic weed species. This is demonstrated in the following examples.

EXAMPLE 8

A solution of 30 mg. of lumazine, 3-cyclohexyl in 5 cc of acetone was added to water in a container, in an amount to give a concentration equivalent to 10 ppm. To the water were added growing floating aquatic weeds of the species *Salvinia braziliensis* and growing submerged aquatic weeds of the species *Elodea densa*. During a two-week period water was added to the container to compensate for evaporation, thus maintaining a constant concentration of active compound. Two weeks after application of the chemical to the water, visual observations showed complete or 100 percent control of both species.

EXAMPLE 9

A solution of 30 mg. of lumazine, 3-cyclooctyl in 5 cc of acetone was added to water in a container, in an amount to give a concentration equivalent to 10 ppm. To the water were added growing floating aquatic weeds of the species *Lemna minor* and *Salvinia braziliensis*. Water was subsequently added to the container to compensate for evaporation as in Example 8. Two weeks after application of the chemical to the water, visual observation showed complete or 100 percent control of the *Salvinia* species and 50 percent control of *Lemna minor*.

It will be appreciated from the foregoing data and discussion that the 3-substituted lumazine family of compounds described herein has unexpected utility as herbicides, and that this unexpected utility prevails throughout the family. It will be noted that the lumazines used in the method of this invention are substantially identical in structure to the 3-substituted pyrido[3,2-d]pyrimidine-2,4(1H,3H)-diones shown and described in U.S. Pat. No. 375,816 entitled certain 3-Substituted-Pyrido[3,2-d]Pyrimidine-2,491H,3H)-Diones inventors Cooke, Compton, and Jacobs, filed June 10, 1969, and issued Aug. 14, 1973. The only difference between the compounds is that the base heterocyclic ring of the lumazines contains 2 nitrogen atoms rather than 1 as in the diones, as is shown in said U.S. Pat. No. 3,752,816, such diones having the formula

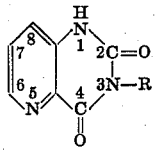

are highly active herbicides when R has been selected from the group consisting of alkyl groups having from 2 to 8 carbon atoms, or cycloalkyl groups having from 3 to 12 carbon atoms. A comparison between the herbicidal activity of the lumazines used in the method of this invention, and the diones referred to above will show that in all instances where the 3-substituent is identical in both compounds the compounds are herbicidally effective. Thus, for example, lumazine, 3-cyclooctyl and 3-cyclooctyl pyrido [3,2-d]pyrimidine-2,4(1H,3H)-dione are both effective herbicides. Thus while the instant disclosure contains only a limited number of specific examples, the comparison between the lumazines and the diones relative to structure and herbicidal activity provides sufficient basis for the limitations relative to the R substituent set forth herein because the limitations for the lumazines are the same as for the 3-substituted pyrido[3,2-d]pyrimidine-2,4(1H,3H)-diones.

For practical use as herbicides, the compounds used in the method of this invention may be formulated with conventional agricultural carriers to obtain the desired concentration and to facilitate handling. For example, these compounds may be formulated into dusts by combining them with such materials as talc or clays. Wettable powder formulations may be obtained by adding a dispersing or suspending agent to the dust formulations referred to above.

If desired, the compounds may be applied as spray solutions which may be prepared by dissolving the compounds in suitable solvents, such as water, xylene, methylated naphthalenes, kerosenes, common agricultural oils, etc., in accordance with well establish agricultural practices. The choice of solvent to be used will be dictated by the solubility of the compound sought to be sprayed in that particular solvent system. Generally, it has been found that the majority of these compounds have a relatively low order of water solubility, so that the use of common agricultural organic solvents is the preferred practice.

The compounds used in the method of this invention may also be emulsified or suspended in water by adding wetting agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

If desired, the compounds can be converted to their salt forms, then dissolved in water and applied as water solutions. They can also be applied as addition compounds and the like.

The alkali or alkaline earth metal and ammonium salts of the 3-substituted lumazines can be prepared by the reaction of the lumazine with the desired metal hydroxide or ammonium hydroxide.

Nitrogenous base addition compounds can be prepared by the addition of the desired nitrogenous base to a solution of the desired 3-substituted lumazine in a suitable inert organic solvent. The addition compound can then be isolated by standard procedures.

Suitable nitrogenous bases are substituted, unsubstituted, cyclic and acyclic amines and guanidines. The amines can be primary, secondary or tertiary amines, polyamines, arylamines, or heterocyclic amines.

Phenolic complexes are formed readily by co-melting the 3-substituted lumazine and phenol in a 1:1 to 2:1, lumazine: phenol mole ratio. They can also be formed by co-dissolving the reactants, in the same ratio in a nonpolar solvent such as nitromethane or a mixture of nitromethane and cyclohexane.

Acid addition compounds can be prepared by mixing a 3-substituted lumazine with an appropriate acid, at room temperature, in a liquid aromatic hydrocarbon solvent. The reaction is immediate. Generally any aromatic hydrocarbon can be used, but it is preferred that it be liquid between 20° and 30°. Benzene, toluene and xylene are examples of satisfactory solvents.

The acid addition compounds can be precipitated with an excess of non-solvent liquid paraffin such as pentane, hexane, heptane or petroleum ether. The product precipitates as a solid or a viscous oil which can be separated by filtration or vacuum evaporation. Alternatively, the product can be separated by vacuum evaporation of the reaction medium at low temperatures, preferably below 50°. Precipitation with a non-solvent is the usual method.

Most acids having an ionization constant greater than $2 \times 10^{-5}$ will form 3-substituted lumazine addition compounds. Preferred acids are halogenated aliphatic acids containing from two to five carbon atoms, halogenated benzoic acid, halogenated phenylacetic acids, halogenated phenoxy acetic acids, organic sulfonic acids, organic phosphonic acids and inorganic phosphoric acids. These acids are preferred because the lumazine addition compounds formed from them are highly phytotoxic and show good oil solubility.

The herbicidal activity of the acid addition compounds, complexes and the like is substantially the same as the herbicidal activity of the free 3-substituted lumazine when applied at the same active ingredient rate.

From the foregoing results it is apparent that the compounds falling within the scope of this invention possess unexpected herbicidal properties. Moreover, it has been shown that these compounds display a high rate of herbicidal activity while simultaneously demonstrating selectivity with respect to desirable, economic crops.

So far as concerns the amount of herbicide to be used this, of course, is subject to such considerations as the type of treatment to be made, the area to be treated, the type of weed sought to be controlled and the stage of development of the species being treated as well as the particular herbicide selected. Generally, however, concentrated herbicidal compositions of the present invention are prepared so as to contain from 5 to about 60 percent of the active herbicidal component. Compositions which are suitable for "as is" application generally contain from 0.1 percent to about 10 percent of active herbicidal component.

Where it is desired to effect substantially complete elimination of all vegetation through use of one or more of the compounds falling within the scope of this invention, it is then necessary to apply a higher rate of the chemical agent to the soil, for example a rate of from 10 to 16 lbs./acre thereof, so as to obtain substantially complete soil sterilization.

What I claim is:

1. A method of controlling plant growth comprising applying to the locus to be protected an effective amount of a compound having the formula

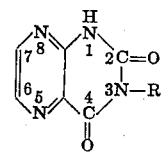

wherein R is selected from the group consisting of alkyl groups having from two to eight carbon atoms, and cycloalkyl groups having from three to 12 carbon atoms.

2. The method of claim 1 wherein the compound is lumazine, 3-isopropyl.

3. The method of claim 1 wherein the compound is lumazine, 3-sec-butyl.

4. The method of claim 1 wherein the compound is lumazine, 3-cyclohexyl.

5. The method of claim 1 wherein the compound is lumazine, 3-cyclooctyl.

* * * * *